United States Patent
Laury et al.

(10) Patent No.: US 11,284,155 B2
(45) Date of Patent: Mar. 22, 2022

(54) ELECTRONIC DEVICE AND METHOD FOR CONTROLLING THE BROADCASTING OF DIGITAL AUDIO AND/OR VIDEO STREAMS, RELATED VEHICLE AND COMPUTER PROGRAM

(71) Applicant: Faurecia Clarion Electronics Europe, Paris (FR)

(72) Inventors: Cyril Laury, Antony (FR); Frantz Lohier, Paris (FR)

(73) Assignee: FAURECIA CLARION ELECTRONICS EUROPE, Paris (FR)

( * ) Notice: Subject to any disclaimer, the term of this patent is extended or adjusted under 35 U.S.C. 154(b) by 0 days.

(21) Appl. No.: 17/077,984

(22) Filed: Oct. 22, 2020

(65) Prior Publication Data

US 2021/0127157 A1  Apr. 29, 2021

(30) Foreign Application Priority Data

Oct. 23, 2019  (FR) ..................... 19 11865

(51) Int. Cl.
*H04N 21/466* (2011.01)
*H04N 21/235* (2011.01)
(Continued)

(52) U.S. Cl.
CPC ....... *H04N 21/4668* (2013.01); *H04N 21/235* (2013.01); *H04N 21/435* (2013.01);
(Continued)

(58) Field of Classification Search
CPC ............ H04N 21/4345; H04N 21/235; H04N 21/435; H04N 21/44213; H04N 21/4532;
(Continued)

(56) References Cited

U.S. PATENT DOCUMENTS 7,502,513 B2 * 3/2009 Linzer ................ H04H 60/37
382/173
8,055,540 B2  11/2011 Pudar
(Continued)

FOREIGN PATENT DOCUMENTS

CN  1984280 A  6/2007

OTHER PUBLICATIONS

French Search Report corresponding to French Application No. FR 1911865, dated Apr. 22, 2020, 2 pages.

*Primary Examiner* — John R Schnurr
(74) *Attorney, Agent, or Firm* — Reising Ethington P.C.

(57) ABSTRACT

An electronic device for controlling the broadcasting of digital audio and/or video streams that includes: a module for receiving a list of upcoming streams able to be broadcast; a module for acquiring a set of profile(s) of a group of user(s); a module for detecting, among the received list and based on the acquired set, a preferred digital stream intended to be broadcast after a current digital stream; and a module for switching from a broadcast of the current stream to a broadcast of the preferred stream. The detection module is configured to detect an event triggering a switch to the preferred stream, and the switching module is configured to operate at least according to an automatic mode, where it is able to switch from the broadcasting of the current stream to that of the preferred stream upon the detection of the triggering event.

12 Claims, 2 Drawing Sheets

(51) Int. Cl.
 *H04N 21/434* (2011.01)
 *H04N 21/435* (2011.01)
 *H04N 21/442* (2011.01)
 *H04N 21/45* (2011.01)
 *H04N 21/462* (2011.01)

(52) U.S. Cl.
 CPC ... *H04N 21/4345* (2013.01); *H04N 21/44213* (2013.01); *H04N 21/4532* (2013.01); *H04N 21/4622* (2013.01)

(58) Field of Classification Search
 CPC ........... H04N 21/4622; H04N 21/4661; H04N 21/4758; H04N 21/44008; H04N 21/812; H04N 21/44016; H04N 21/41422; H04N 21/4668; H04N 21/4383
 See application file for complete search history.

(56) References Cited

U.S. PATENT DOCUMENTS

| | | | |
|---|---|---|---|
| 2008/0320513 A1* | 12/2008 | Wong | H04H 60/46 725/38 |
| 2011/0247036 A1* | 10/2011 | Adimatyam | H04N 21/4147 725/40 |
| 2015/0095932 A1 | 4/2015 | Ren | |
| 2016/0044357 A1 | 2/2016 | Wang | |
| 2016/0261922 A1* | 9/2016 | Adderly | H04N 21/4826 |
| 2017/0289641 A1* | 10/2017 | Patel | H04N 21/6125 |
| 2017/0374426 A1 | 12/2017 | Wang | |
| 2019/0306574 A1 | 10/2019 | Eccles | |

\* cited by examiner

ELECTRONIC DEVICE AND METHOD FOR CONTROLLING THE BROADCASTING OF DIGITAL AUDIO AND/OR VIDEO STREAMS, RELATED VEHICLE AND COMPUTER PROGRAM

TECHNICAL FIELD

The present invention relates to an electronic control device for controlling the broadcasting of digital audio and/or video streams.

The invention also relates to a passenger transport vehicle, in particular a motor vehicle, comprising such an electronic control device.

The present invention also relates to a method for controlling the broadcasting of digital audio and/or video streams, the method being implemented by such an electronic control device.

The invention also relates to a non-transitory computer-readable medium comprising a computer program including software instructions which, when executed by a computer, implement such a control method.

The invention relates to the field of audio/video systems capable of broadcasting digital audio and/or video streams for a group of user(s). The invention in particular relates to the field of audio/video systems intended to be embedded in passenger transport vehicles, in particular in motor vehicles.

BACKGROUND

Electronic control devices of the aforementioned type are known from documents US 2016/0044357 A1 and US 2017/0374426 A1.

US 2016/0044357 A1 describes a personalized recommendation method and system for the broadcasting of video streams, in particular television streams. This recommendation system is an improved video entertainment system that helps users skip unwanted programs, such as advertisements and restricted content, with an adaptive television guide function. The recommendation system can also suggest to the user what television channel to switch to at the time of this skipping of an unwanted program.

US 2017/0374426 A1 also relates to a system for broadcasting television streams, the system in particular comprising a content recommendation module configured to analyze preferences of the user and to generate a recommendation for television program(s) corresponding to the preferences of the user. This broadcasting system further comprises an advertisement detection module configured to detect advertisements broadcast on a specific television channel and to communicate to the user, if the latter wishes to skip the advertisement, the indication of another television program to which to switch.

However, the interaction of the user with such systems for broadcasting video streams is not always optimal.

SUMMARY

One aim of the invention is therefore to provide an electronic device and an associated method for controlling the broadcasting of digital audio and/or video streams making it possible to offer an easier interaction with the user, and thus to obtain a more effective management of the broadcasting of digital audio and/or video streams.

To that end, the invention relates to an electronic control device for controlling the broadcasting of digital audio and/or video streams, the control device comprising:

- a reception module configured to receive a list of upcoming digital audio and/or video streams able to be broadcast,
- an acquisition module configured to acquire a set of profile(s) of a group of user(s), the group including at least one user, each profile being associated with a respective user,
- a detection module configured to detect, among the received list of upcoming streams and based on the acquired set of profile(s), a preferred digital stream intended to be broadcast after a current digital stream being broadcast,
- a switching module configured to switch from the broadcasting of the current digital stream to the broadcasting of the preferred digital stream,
- the detection module further being configured to detect an event triggering a switch toward the preferred digital stream, and
- the switching module further being configured to operate at least according to an automatic switching mode, in which it is configured to switch from the broadcasting of the current digital stream to the broadcasting of the preferred digital stream upon detecting the triggering event.

With the electronic control device, the detection module detects a triggering event of the switching to the preferred digital stream, detected beforehand, and when it is operating according to the automatic switching mode, the switching module next switches from the broadcasting of the current digital stream to the broadcasting of the preferred digital stream upon detecting the triggering event. In other words, when the switching module is in automatic switching mode, it automatically switches to the broadcasting of the preferred digital stream, previously detected, once a triggering event has been detected by the detection module.

The control device then allows the switching to the preferred digital stream, which is both quick and effective, the group of user(s) not needing to confirm that it wishes to switch to the detected preferred digital stream, since this switching is done automatically once the triggering event is detected.

As an optional addition, the switching module is also able to operate according to a manual switching mode, in which the switching to the preferred digital stream is done only after receiving confirmation from the group of user(s), which then allows the group of user(s) to prevent switching to the detected preferred stream when it wishes to control this potential switching.

Also as an optional addition, the group of user(s) also has the possibility, through the selection module, of selecting the desired operating mode of the switching module among the automatic switching mode and the manual switching mode.

Also as an optional addition, the triggering event of the switching to the preferred digital stream is the presence of unwanted content, such as an advertisement, in the current digital stream; or the end of the current digital stream being broadcast with a following digital stream provided to be broadcast next, that is to say the transition from a current digital stream to a following digital stream; or a switching instruction from the group of user(s), for example when the group of user(s) no longer wishes to listen to and/or see the current digital stream and wishes to go to the broadcast of another digital stream.

According to other advantageous aspects of the invention, the electronic control device comprises one or more of the following features, considered alone or according to all technically possible combinations:

the switching module is further configured to operate according to a manual switching mode, in which it is configured, in case of detection of the triggering event, to send a request to the group of user(s) to confirm the switching to the preferred digital stream, then to switch from the broadcast of the current digital stream to the broadcast of the preferred digital stream only after receiving said confirmation from the group of user(s), the device further preferably comprising a selection module configured to select an operating mode of the switching module among the automatic switching mode and the manual switching mode;

the detection module is configured to detect the preferred digital stream and/or the triggering event from a combination of at least two detection criteria, chosen among a first detection criterion based on metadata, a second detection criterion based on automatic content recognition and a third detection criterion based on feedback from the group of user(s), associated with a preceding detection;

the detection module is further configured to calculate a reliability index of a respective detection, the reliability index preferably depending on a weight of the detection criteria;

the detection module includes a recommendation engine configured to be coupled with a content signature database;

said device comprises a radio transceiver, and the detection module is coupled, via said radio transceiver, with at least one connected service, in particular for the analysis of a fingerprint;

the triggering event is chosen among the group consisting of: the presence of unwanted content in the current digital stream; the end of the current digital stream being broadcast; and a switching instruction by the group of user(s);

when the group includes a plurality of users, the acquisition module is further configured to merge the plurality of acquired profiles into a merged profile and the detection module is configured to detect the preferred digital stream based on said merged profile, among the received list of upcoming streams; and the device further comprises a database of user preference(s) connected to the acquisition module.

The invention also relates to a passenger transport vehicle, in particular a motor vehicle, the transport vehicle comprising an electronic device for controlling the broadcast of digital audio and/or video streams, as defined above.

The invention also relates to a method for controlling the broadcasting of digital audio and/or video streams, the method being implemented by such an electronic control device and comprising:

receiving a list of upcoming digital audio and/or video streams able to be broadcast, acquiring a set of profile(s) of a group of user(s), the group including at least one user, each profile being associated with a respective user, detecting, among the received list of upcoming streams and based on the acquired set of profile(s), a preferred digital stream intended to be broadcast after a current digital stream being broadcast, switching from the broadcasting of the current digital stream to the broadcasting of the preferred digital stream, the detecting further including detecting an event triggering a switch toward the preferred digital stream, and the switching being carried out according to an automatic switching mode, in which the switch from the broadcasting of the current digital stream to the broadcasting of the preferred digital stream is done upon detecting the triggering event.

The invention also relates to a non-transitory computer-readable medium comprising a computer program including software instructions which, when executed by a computer, implement a control method as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
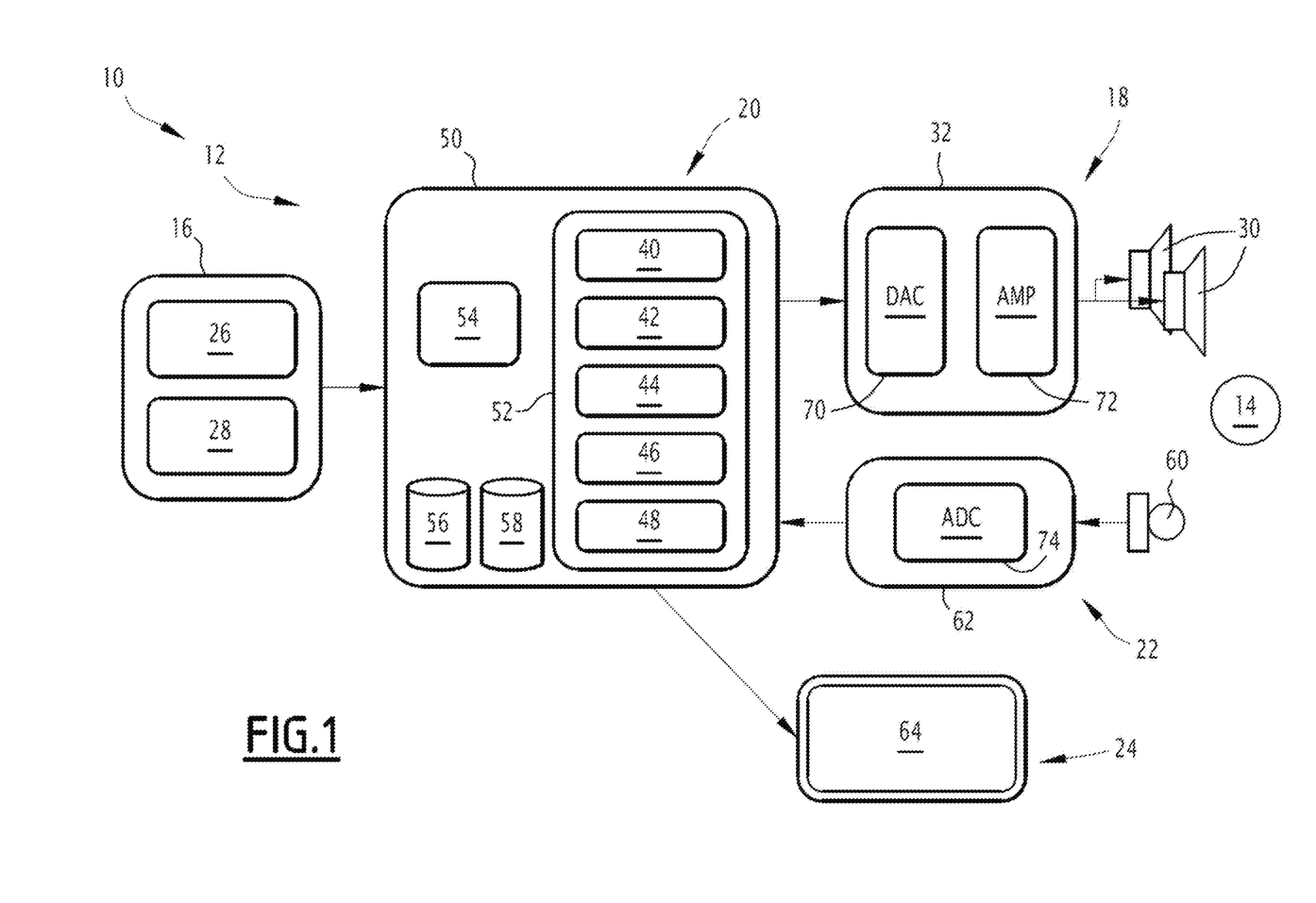
FIG. 1 is a schematic view of a passenger transport vehicle comprising a system for broadcasting digital audio and/or video streams, the broadcasting system in particular including a source of digital audio and/or video streams, an electronic control device for the broadcasting of digital audio and/or video streams, coming from said source, and a device for broadcasting such streams to a group of user(s)

In FIG. 1, a passenger transport vehicle 10 comprises an audio/video system 12 for broadcasting digital audio and/or video streams to a group of user(s) 14. The transport vehicle 10 is for example a motor vehicle.

The transport vehicle 10 comprises a passenger compartment, not shown, inside which the audio/video system 12 is positioned.

The audio/video system 12 is configured to broadcast the digital audio and/or video streams, and is preferably able to be embedded in the transport vehicle 10. In the example of FIG. 1, the audio/video system 12 is an audio system configured to broadcast only digital audio streams.

The audio/video system 12 comprises a source 16 of digital audio and/or video streams, a device 18 for broadcasting, for the group of user(s) 14, digital audio and/or video streams among those coming from the source 16, and an electronic device 20 for controlling the broadcasting of said digital audio and/or video streams, the control device 20 being connected between the source 16 and the broadcasting device 18.

Additionally, the audio/video system 12 comprises a device 22 for receiving at least one signal from the group of user(s) 14, and a device 24 for displaying information for the group of user(s) 14, the reception device 22 and the display device 24 being connected to the control device 20.

The group of user(s) includes one or several user(s) 14, each user 14 having a respective profile, in other words, each profile is associated with a respective user 14. Each profile includes one or several preferences of the respective user 14, the preference(s) defining tastes of the user 14 relative to the digital audio and/or video streams that may be broadcast.

The source 16 of audio and/or video streams is configured to deliver the digital audio and/or video streams successively, that is to say one after the other. In the example of FIG. 1, the source 16 is an audio source configured to deliver only digital audio streams.

The source 16 is for example a digital tuner, such as a digital radio tuner, or a digital television tuner, also called digital TV tuner.

The source 16 for example includes an audio/video receiver 26 able to receive, on different reception channels, digital audio and/or video streams, for example from radio stream broadcasters, or television stream broadcasters. As an optional addition, the source 16 includes a background scan module 28 of the different digital audio and/or video streams received by the audio/video receiver 26.

The broadcasting device 18 comprises one or several speaker(s) 30 and an electronic transmission channel 32 connected to the speaker(s) 30.

The control device 20 is configured to control, that is to say to command, the broadcasting of digital audio and/or video streams, and in particular to successively deliver, to the broadcasting device 18, digital audio and/or video streams intended to be broadcast to the group of user(s) 14.

The control device 20 comprises a module 40 for receiving a list of upcoming digital audio and/or video streams able to be broadcast, a module 42 for acquiring a set of profile(s) of the group of user(s) 14, a module 44 for detecting a preferred digital stream intended to be broadcast after a current digital stream being broadcast, and a module 46 for switching from a broadcast of the current digital stream to a broadcast of the preferred digital stream.

As an optional addition, the control device 20 comprises a module 48 for selecting an operating mode of the switching module 46 among an automatic switching mode and a manual switching mode.

In the example of FIG. 1, the electronic control device 20 comprises an information processing unit 50 for example made up of a memory 52 and a processor 54 associated with the memory 52.

As an optional addition, the control device 20 comprises a first database 56 containing the preferences of the different users 14 and connected to the acquisition module 42, the first database 56 also being called user content preference database.

Also as an optional addition, the control device 20 comprises a second database 58 containing content signatures for the digital audio and/or video streams able to be broadcast, the second database also being called content signature database.

Also as an optional addition, the control device 20 comprises a radio transceiver, not shown, in particular configured to send, for example in the form of radio waves, data, such as requests, to a remote electronic equipment item, and/or to receive, in the opposite direction, data from said electronic equipment item or from another electronic equipment item.

The radio transceiver is a wireless transceiver. It is typically according to one or several mobile telephony standards, known in themselves, for example among the group consisting of: a 2G (2nd generation) standard, a 3G (3rd generation) standard, a 4G (4th generation) standard, a 5G (5th generation) standard, and later telecommunications standards (for example, 6G). In a variant or additionally, it is typically according to one or several wireless communication standards, such as one or several IEEE 802.11 standards, also called W-Fi™ standards.

The 2G standard(s) are typically the GSM (Global System for Mobile communications) standard, the CDMA (Code Division Multiple Access standard), the GPRS (General Packet Radio Service) standard and the EDGE (Enhanced Data Rates for GSM Evolution) standard. The 3G standard(s) are typically the UMTS (Universal Mobile Telecommunications System) standard, the CDMA2000 (Code Division Multiple Access 2000) standard, the HSDPA (High Speed Downlink Packet Access) standard and the HSUPA (High Speed Uplink Packet Access) standard. The 4G standard(s) are typically the LTE (Long Term Evolution) standard and the LTE Advanced standard. The LTE Advanced standard is also called 4.5G standard. The 5G standard is typically the 5G NR (5G New Radio) standard.

The remote electronic equipment item is for example a connected electronic equipment item, such as a cloud equipment item. The cloud equipment item is typically configured to carry out a connected service, such as a cloud service, the connected service then being accessible by the electronic control device 20 via its radio transceiver.

A "connected service" refers to a service, such as an analysis of a fingerprint, and/or automatic content recognition (ACR), carried out by a remote electronic equipment item and accessible by the electronic control device 20 via its radio transceiver by going through a mobile telephone network such as 2G, 3G, 4G, 5G, 6G or a later generation.

In the example of FIG. 1, the reception module 40, the acquisition module 42, the detection module 44 and the switching module 46, as well as, optionally and additionally, the selection module 48, are each made in the form of software, or a software component, and executable by the processor 54. The memory 52 of the control device 20 is then able to store software for receiving the list of upcoming digital audio and/or video streams able to be broadcast, software for acquiring a set of profile(s) of the group of user(s) 14, software for detecting the preferred digital stream intended to be broadcast after the current digital stream, and software for switching from the broadcast of the current digital stream to the broadcast of the preferred digital stream, as well as, optionally and additionally, software for selecting the operating mode of the switching software among the automatic switching mode and the manual switching mode. The processor 54 is then able to execute each of the software applications among the acquisition software, the detection software and the switching software, as well as, optionally and additionally, the selection software.

In a variant that is not shown, the reception module 40, the acquisition module 42, the detection module 44 and the switching module 46, as well as, optionally and additionally, the selection module 48, are each made in the form of a programmable logic component, such as an FPGA (Field Programmable Gate Array), or an integrated circuit, such as an ASIC (Application-Specific Integrated Circuit).

When the control device 20 is made in the form of one or several software programs, i.e., in the form of a computer program, it is further able to be stored on a medium, not shown, readable by computer. The computer-readable medium is for example a medium suitable for storing electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

The reception device 22 comprises one or several sensor(s) 60 and an electronic reception channel 62 connected to the sensor(s) 60 and configured to receive at least one signal via the sensor(s) 60.

The display device 24 comprises a display screen 64 and a module, not shown, for displaying information on the display screen 64.

The audio/visual receiver 26 is known per se.

The background scanning module 28 is configured to regularly determine a list of upcoming digital audio and/or video streams able to be broadcast via the source 16, then to deliver said list to the control device 20, in particular to the reception module 40.

The transmission channel 32 is able to be connected between the control device 20 and the speaker(s) 30, and for example comprises a digital to analog converter 70, also denoted DAC, and an amplifier 72, also denoted AMP, connected at the output of the digital to analog converter 70. The amplifier 72 is connected to the input of the speaker(s) 30.

The reception module 40 is configured to receive the list of upcoming digital audio and/or video streams able to be broadcast, for example from the background scanning module 28. The reception module 40 is preferably configured to regularly receive the list of upcoming streams, for example every 10 seconds, preferably with a periodicity inclusively between 1 and 5 seconds, and still more preferably with a periodicity inclusively between 2 and 3 seconds.

The list of upcoming streams contains all of the upcoming digital audio and/or video streams about to come from the source 16, for all of the reception channels of the audio/video receiver 26. In other words, the list of upcoming digital streams is a list of available digital streams.

The acquisition module 42 is configured to acquire the set of profile(s) of the group of user(s) 14, for example from the first database 56, also called user content preference database.

The acquisition module 42 is for example configured to acquire the profile of the user from the first database 56, from a choice of the user, the user having chosen his profile beforehand.

In a variant, the acquisition module 42 is configured to identify a respective user via a recognition algorithm and from at least one signal from the user, detected by at least one corresponding sensor, then to acquire the profile of the identified user, from the database of user preference(s), that is to say from the first database 56. In other words, the acquisition module 42 is configured to recognize, i.e. to determine, the identity of the or each user automatically via one or several respective sensors, then to acquire the corresponding user profile(s) from the first database 56 based on the recognized user identity or identities.

According to this variant, the acquisition module 42 is for example configured to identify the user(s) via a voice recognition algorithm from a sound signal, such as a voice message, emitted by each user and detected by a corresponding sound sensor, such as a microphone, for example the microphone forming the sound sensor 60 described hereinafter. In addition to this identification via the voice recognition algorithm, the acquisition module 42 is configured to detect one or several specific words in the voice message emitted by each user, in order to further facilitate said identification.

According to this variant, the acquisition module 42 is, additionally or alternatively, configured to identify the user via a facial recognition algorithm from an image of the user detected by an image sensor, such as a camera.

Also in a variant, the acquisition module 42 is configured to acquire a signal from the user, such as a sound signal via a sound sensor, for example a microphone, and an image of the user detected by an image sensor, for example a camera. The acquisition module 42 is then configured to convert the acquired sound signal and the detected image into a corresponding user profile. It is of course understood that the voice recognition algorithms and those for facial recognition are known as such. As an example, a conversion algorithm based on voice recognition and facial recognition is used to identify the user. The conversion algorithm compares the identity identified by voice recognition and the identity identified by facial recognition. If the two identified identities are identical, then the conversion algorithm confirms the identified identity; otherwise, the conversion algorithm uses the identified identity that seems most likely to it.

As an optional addition, when the group includes a plurality of users 14, the acquisition module 42 is further configured to merge the plurality of acquired profiles, typically from the first database 56, into a merged profile. The acquired merged profile is preferably unique for the group including the plurality of users 14.

The detection module 44 is configured to detect, among the list of upcoming streams received by the reception module 40 and based on the set of profile(s) acquired by the acquisition module 42, the preferred digital stream intended to be broadcast after the current digital stream being broadcast. The detection module 44 is further configured to detect the triggering event for switching to the preferred digital stream.

The detection module 44 is for example configured to detect the preferred digital stream from metadata, such as metadata contained natively in the digital stream intended to be broadcast. Such metadata are for example contained in a DAB (Digital Audio Broadcasting) digital radio stream, or in a data stream of the RDS (Radio Data System) type.

In a variant or additionally, the detection module 44 is configured to detect the preferred digital stream from automatic content recognition, also denoted ACR. The automatic content recognition technology ACR typically makes it possible to classify, by categories, the type of content in the digital stream able to be broadcast, the categories for example being chosen among advertisement detection, music genre detection, or speech detection, for example in the case of TV news programs or news streams.

The detection module 44 for example includes a recommendation engine, not shown, configured to be coupled with the second database 58 containing the content signatures for the digital streams able to be broadcast, also called content signature database. Additionally, the recommendation engine is configured to be coupled with the first database 56 containing the preferences of the different users 14.

In the example of FIG. 1, the recommendation engine is embedded within the control device 20, preferably within the detection module 44.

In a variant, the recommendation engine is embedded within a respective remote electronic equipment item, for example within a cloud equipment item, and the detection module 44 is then coupled to the recommendation engine via the radio transceiver previously described.

More generally, the detection module 44 is configured to be coupled, via said radio transceiver, with at least one connected service, such as a connected service for fingerprint analysis, and/or a connected service for automatic content recognition.

Preferably, a first recommendation engine is embedded within the control device 20, for example in the detection module 44, and a second recommendation engine is embedded within a respective remote electronic equipment item, for example within a cloud equipment item, and the detection module 44 is then coupled to the second recommendation engine via the radio transceiver previously described.

According to this preferred variant, the detection module 44 is, in other words, configured to use at least one connected service so as to further improve the detection. For example, a user indicates that he likes a broadcast piece of music, but at that moment the detection module 44 does not have information about the name of the piece or about the artist. The detection module 44 is then configured to record a fingerprint that is associated with said content, typically by recording part of said content, then to send a request to the remote electronic equipment item, such as the cloud equipment item, in order to obtain an analysis of this fingerprint, and lastly to update the first database 56 containing the user preferences with the analysis of the fingerprint thus obtained, this analysis typically including metadata for said content, such as the name of the piece and/or name of the artist.

According to this preferred variant, the detection module 44 is, in other words, [configured] to download, via a cellular network (when it is available) or a wireless communication network, such as a W-Fi™ network, additional information that is then used by the detection algorithm integrated into the detection module 44, in order to further improve said detection. One skilled in the art will understand that the detection module 44 is further able to continue to operate autonomously (also called stand alone), even if the connection with the cellular network or with the wireless communication network via the radio transceiver is temporarily unavailable.

As an optional addition, the detection module 44 is configured to detect the preferred digital stream and/or the triggering event from a combination of at least two detection criteria, chosen among a first detection criterion based on the metadata, a second detection criterion based on the automatic content recognition (ACR) and a third detection criterion based on feedback from the group of user(s) 14, associated with a preceding detection.

The triggering event is the presence of unwanted content in the current digital stream; or the end of the current digital stream being broadcast with a following digital stream provided to be broadcast next, that is to say the transition from the current digital stream to the following digital stream; or a switching instruction from the group of user(s) 14. The switching instruction typically corresponds to the case where the group of user(s) 14 wishes to interrupt the broadcast of the current digital stream and go to the broadcast of another digital stream.

The unwanted content is for example an advertisement, or restricted content, such as content authorized only for one age category of the user(s) 14. For advertisement detection, the detection module 44 is then for example configured to detect an increase in the sound level inside the digital stream, a break in the style of the content of the digital stream, or by signature analysis, such as a jingle.

When the triggering event is the switching instruction from the group of user(s) 14, such as a tactile selection on the screen 64 of an activation of an actuator, not shown, such as a button or a dial, the detection module 44 is typically configured to detect said event via the acquisition module 42, which is further suitable for acquiring said switching instruction.

One skilled in the art will then understand that, when the triggering event is said switching instruction, its detection does not require using the aforementioned detection criterion or criteria.

Likewise, when the triggering event is the end of the current digital stream being broadcast, its detection is typically done from the list of upcoming streams, received by the reception module 40, and does not also require using the aforementioned detection criterion or criteria.

As an optional addition, the detection module 44 is further configured to calculate a reliability index of a respective detection. When the detection module 44 performs the detection from the combination of several detection criteria, as previously described, the reliability index preferably depends on a weight of said detection criteria.

Also as an optional addition, when the acquisition module 42 has merged several acquired profiles into a single merged profile, the detection module 44 is further configured to detect the preferred digital stream based on said merged profile, and among the received list of upcoming streams.

The detection module 44 is preferably configured to regularly detect the preferred digital stream and/or the triggering event. The detection module 44 is preferably configured to perform said detection for example every 10 seconds, preferably with a periodicity inclusively between 1 and 5 seconds, still more preferably inclusively between 2 and 3 seconds.

For the third detection criterion depending on the feedback of the group of user(s) 14, the detection module 44 is for example configured to mark the content of the digital stream as assessed, in case of positive feedback by the group of user(s) 14, this marking for example being associated either directly with the metadata having made it possible to characterize said content, or with the fingerprint that is associated with said content, typically by recording part of said content.

The detection module 44 is then configured to assign an increased score to digital stream content having previously received positive feedback from the group of user(s) 14, and as a corollary to assign a lower score to digital stream content having received negative feedback from said group of user(s) 14.

In other words, the third detection criterion seeks to favor the detection of content having previously caused positive feedback from the group of user(s) 14, and conversely to avoid the detection of content having elicited negative feedback from said group.

When the reliability index depends on a weight of the detection criteria, a weight of greater value is for example assigned to the second detection criterion depending on automatic content recognition via the recommendation engine coupled to the content signature database 58.

The switching module 46 is configured to switch from the broadcasting of the current digital stream to the broadcasting of the preferred digital stream, previously detected by the detection module 44.

The switching module 46 is preferably further configured to operate at least according to an automatic switching mode, in which it is suitable for switching from the broadcasting of the current digital stream to the broadcasting of the preferred digital stream upon detection of the triggering event by the detection module 44.

As an optional addition, the switching module 46 is further configured to operate according to a manual switching mode, in which it is suitable, in case of detection of the triggering event by the detection module 44, for first sending a request to the group of user(s) 14 to confirm the switching to the preferred digital stream; then for switching from the broadcast of the current digital stream to the preferred digital stream only after receiving said confirmation from the group of user(s) 14.

In other words, when the switching module 46 is operating according to the automatic switching mode, it switches automatically from the broadcasting of the current digital stream to the broadcasting of the preferred digital stream upon detection of the triggering event by the detection module 44, without confirmation from the user(s) 14. Conversely, when the switching module 46 is operating according to the manual switching mode, it requires prior confirmation from the user(s) 14 before switching to the preferred digital stream, still in case of detection of the triggering event by the detection module 44.

As an optional addition, the selection module 48 is configured to select the desired operating mode of the switching module 46 among the automatic switching mode and the manual switching mode. The selection module 48 is preferably configured to perform said selection of the switching module 46 from an instruction received from the user(s) 14, for example from a tactile selection on the screen 64, which is preferably touch-sensitive.

Each sensor 60 is able to detect a signal from a respective user 14, such as a tactile signal, that is to say a tactile touch, or a sound signal, such as a voice command, or a visual signal, such as a gaze of the user 14. The sensor 60 is for example a touchpad for detecting the tactile signal, or a microphone for detecting the sound signal, or an image sensor for detecting the visual signal.

The reception channel 62 is configured to receive at least one signal from a respective user 14 via the sensor(s) 60, and is in particular configured to process a signal coming from a respective sensor 60. In the example of FIG. 1, the reception channel 62 comprises an analog to digital converter 74, also denoted ADC, the analog to digital converter 74 being connected to each sensor 60.

Figure 2:
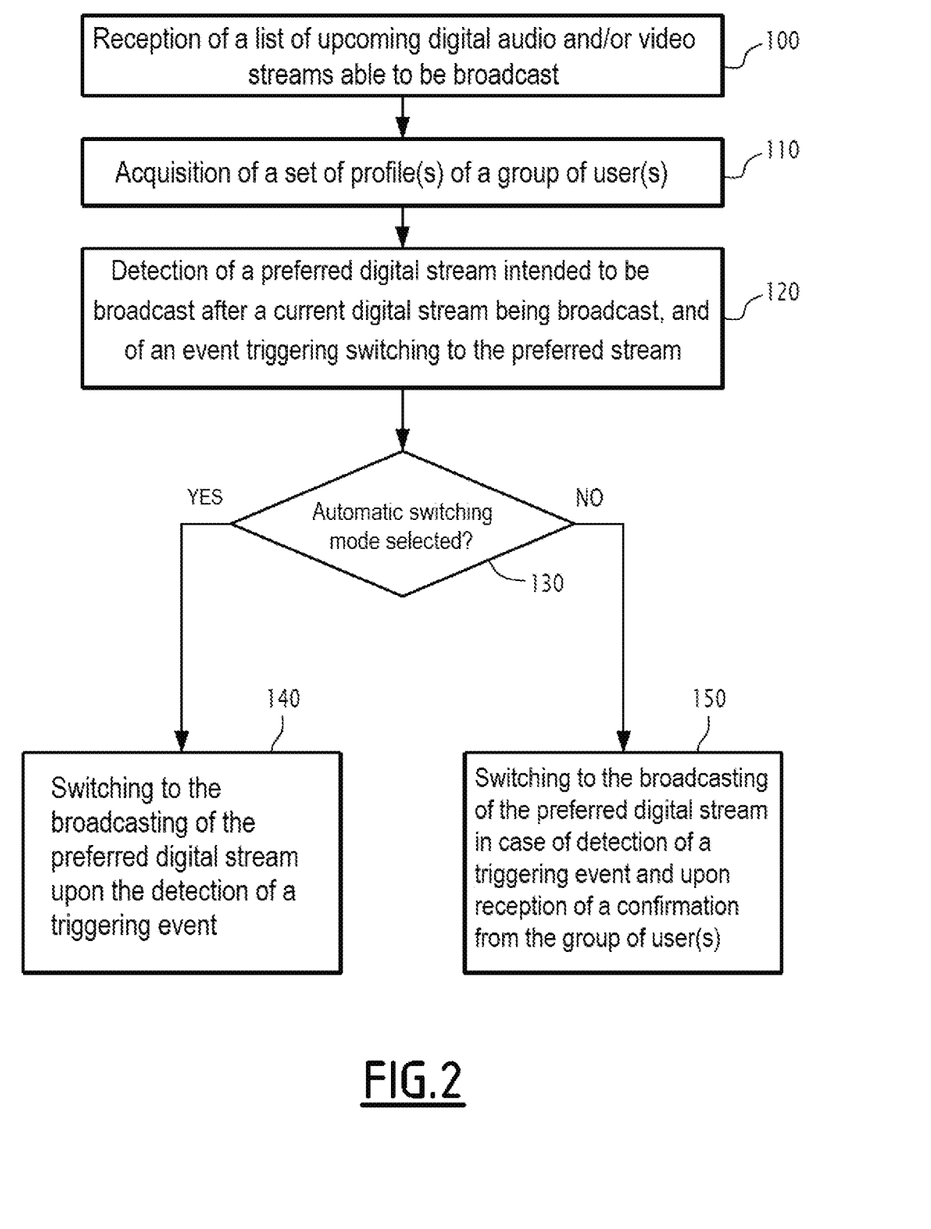
FIG. 2 is a flowchart of a method, according to an embodiment of the invention, for controlling the broadcasting of digital audio and/or video streams, the method being carried out by the control device of FIG. 1.

The operation of the audio/video system 12 and in particular of the electronic control device 20, will now be described in light of FIG. 2 showing an organizational chart of a method for controlling the broadcasting of digital audio and/or video streams, the method being implemented by the electronic control device 20.

During an initial step 100, the control device 20 receives, via its reception module 40, the list of upcoming digital audio and/or video streams able to be broadcast, the latter typically being received from the background scanning module 28.

The control device 20 goes to the following step 110, during which it acquires, via its acquisition module 42, the set of profile(s) of the group of user(s) 14, each acquired profile including one or several preferences of the respective user 14. As an optional addition, when the group includes several users 14, the acquisition module 42 further merges the plurality of acquired profiles into a single merged profile.

During this acquisition step 110, the acquisition module 42 acquires the set of profile(s) from the first database 56, for example after a prior choice by each user, each user then having chosen his profile.

In a variant, during this acquisition step 110, the acquisition module 42 identifies a respective user via the recognition algorithm and from at least one signal from the user, detected by at least one corresponding sensor, then acquires, from the database of user preference(s), the profile of the identified user. In other words, the acquisition module 42 determines the identity of the user via a corresponding sensor and via the recognition algorithm, and next acquires, from the first database 56, the profile(s) corresponding to the determined user identity or identities.

This identification of the user is for example done via the voice recognition algorithm from a voice signal of the user detected by a sound sensor, such as a microphone; and/or via the facial recognition algorithm from at least one specific image, such as an image of the face of the user, detected by an image sensor, for example a camera.

According to this variant, when the identification is done from a voice signal, the acquisition module 42 is additionally further capable of detecting one or several specific words spoken by the user, in order to further facilitate this identification of the user.

The control device 20 detects, during the following step 120 and via its detection module 44, the preferred digital stream intended to be broadcast after the current digital stream being broadcast, then any triggering event for the switching to said preferred stream.

As previously described, this detection of the preferred digital stream and/or of the triggering event is for example done based on metadata and/or based on automatic content recognition (ACR), and/or based on the feedback from the group of user(s) 14, associated with a preceding detection done by the detection module 44.

As an optional addition, when the acquisition module 42 has merged several acquired profiles into a single merged profile during the preceding step 110, the detection module 44 next detects, during step 120, the preferred digital stream based on said merged profile, and among the received list of upcoming streams.

As an optional addition, when the switching module is able to operate both according to the automatic switching mode and according to the manual switching mode, the control device 20 tests, during a following test step 130 and via its selection module 48, whether the automatic switching mode has been selected by the selection module 48, following a corresponding instruction from the user(s) 14.

If the test is positive, that is to say if the automatic switching mode has been selected, then the control device 20 goes to the following step 140, during which the switching module 46 switches the broadcasting of the current digital stream to the broadcasting of the preferred digital stream upon the detection of the triggering event. In other words, during this switching step 140, the switching from the current digital stream to the preferred digital stream is done automatically, without needing confirmation from the user(s) 14.

At the end of the test step 130, if the test is negative, that is to say if the automatic switching mode has not been selected, or in other words if the manual switching mode has been selected, then the control device 20 goes from the test step 130 to step 150 during which the switching module 46 will request prior confirmation from the group of user(s) 14 before switching the broadcasting of the current digital stream to the broadcasting of the preferred digital stream. To that end, during step 150 and in case of detection of the triggering event during the preceding step 120, the switching module 46 begins by sending the request for confirmation of the switching to the group of user(s) 14, then switches from the broadcasting of the current digital stream to that of the preferred digital stream only after having received said confirmation from the group of user(s) 14.

At the end of step 140, or step 150, the control device 20 returns to the initial step 100, during which it receives a new list of upcoming digital streams able to be broadcast. One skilled in the art will then understand that the control method is carried out regularly, for example every 10 seconds, preferably with a periodicity inclusively between 1 and 5 seconds, and still more preferably with a periodicity inclusively between 2 and 3 seconds.

In a variant, when the switching module 46 is able to operate only according to the automatic switching mode, one skilled in the art will understand that the control device 20 goes directly from the detection step 120 to the switching step 140.

Thus, the automatic switching mode makes it possible to switch to the previously detected preferred digital stream once a respective triggering event of said switching has been detected by the detection module 44, without requiring confirmation from the group of user(s) 14. The control device 20 then offers quick and efficient switching to a preferred, previously detected digital stream.

The control device 20 then makes it possible to effectively avoid the broadcasting of unwanted content for the user 14, or to switch easily and quickly to a preferred digital stream better corresponding to the user's preferences 14.

As an optional addition, the manual switching mode allows the user 14 to better control, if he wishes to do so periodically, the switching from the current digital stream to the preferred digital stream, by confirming beforehand whether he indeed wishes to switch to the preferred digital stream proposed by the control device 20. If said switching does not suit the user 14, it then suffices for him not to pursue the switching confirmation request.

The detection of the preferred digital stream and/or of the triggering event is further particularly effective due to the use of the recommendation engine coupled with the content signature database 58, and also preferably the database of user preferences 56.

The detection is further improved when it is done from a combination of several detection criteria, in particular chosen among the first detection criterion based on metadata, the second detection criterion based on automatic content recognition and the third detection criterion based on feedback from the group of user(s) 14.

One can thus see that the electronic control device 20 and the control method make it possible to offer the group of user(s) 14 an easier interaction with the audio/video system 12, and then to propose more efficient management of the broadcasting of digital audio and/or video streams.

The invention claimed is:

1. An electronic control device for controlling the broadcasting of digital audio and/or video streams, the control device comprising:
   a reception module configured to receive a list of upcoming digital audio and/or video streams able to be broadcast,
   an acquisition module configured to acquire a set of profile(s) of a group of user(s), the group including at least one user, each profile being associated with a respective user,
   a detection module configured to detect, among the received list of upcoming streams and based on the acquired set of profile(s), a preferred digital stream intended to be broadcast after a current digital stream being broadcast and to detect an event triggering a switch toward the preferred digital stream, and
   a switching module configured to switch from the broadcasting of the current digital stream to the broadcasting of the preferred digital stream,
   wherein the switching module is further configured to operate at least according to an automatic switching mode, in which it is configured to switch from the broadcasting of the current digital stream to the broadcasting of the preferred digital stream upon detecting the triggering event,
   wherein the detection module is configured to detect the preferred digital stream and/or the triggering event from a combination of at least two detection criteria, chosen among a first detection criterion based on metadata, a second detection criterion based on automatic content recognition and a third detection criterion based on feedback from the group of user(s), associated with a preceding detection, and
   wherein the detection module is further configured to calculate a reliability index of a respective detection, the reliability index preferably depends on a weight of the detection criteria.

2. The device according to claim 1, wherein the switching module is further configured to operate according to a manual switching mode, in which it is configured, in case of detection of the triggering event, to send a request to the group of user(s) to confirm the switching to the preferred digital stream, then to switch from the broadcast of the current digital stream to the broadcast of the preferred digital stream only after receiving said confirmation from the group of user(s).

3. The device according to claim 2, wherein the device further comprises a selection module configured to select an operating mode of the switching module among the automatic switching mode and the manual switching mode.

4. The device according to claim 1, wherein the detection module includes a recommendation engine configured to be coupled with a content signature database.

5. The device according to claim 1, wherein said device comprises a radio transceiver, and the detection module is coupled, via said radio transceiver, with at least one connected service for the analysis of a fingerprint.

6. The device according to claim 1, wherein the triggering event is chosen among the group consisting of: the presence of unwanted content in the current digital stream; the end of the current digital stream being broadcast; and a switching instruction by the group of user(s).

7. The device according to claim 1, wherein, when the group includes a plurality of users, the acquisition module is further configured to merge the plurality of acquired profiles into a merged profile and the detection module is configured to detect the preferred digital stream based on said merged profile, among the received list of upcoming streams.

8. The device according to claim 1, wherein the device further comprises a database of user preference(s) connected to the acquisition module.

9. The device according to claim 8, wherein the acquisition module is further configured to identify a respective user via a voice and/or facial recognition algorithm, said algorithm being associated with at least one corresponding sensor; then to acquire, from the database of user preference(s), the corresponding profile of the identified user.

10. A passenger transport vehicle comprising the electronic control device according to claim 1.

11. A method for controlling the broadcasting of digital audio and/or video streams, the method being implemented by such an electronic control device and comprising:
   receiving a list of upcoming digital audio and/or video streams able to be broadcast,
   acquiring a set of profile(s) of a group of user(s), the group including at least one user, each profile being associated with a respective user,
   detecting, among the received list of upcoming streams and based on the acquired set of profile(s), a preferred digital stream intended to be broadcast after a current digital stream being broadcast and detecting an event triggering a switch toward the preferred digital stream,
   switching from the broadcasting of the current digital stream to the broadcasting of the preferred digital stream,
   wherein the detecting further includes detecting an event triggering a switch toward the preferred digital stream, and wherein the switching is carried out according to an automatic switching mode, in which the switch from the broadcasting of the current digital stream to the broadcasting of the preferred digital stream is done upon detecting the triggering event, wherein the detecting further includes detecting the preferred digital stream and/or the triggering event from a combination of at least two detection criteria, chosen among a first detection criterion based on metadata, a second detection criterion based on automatic content recognition and a third detection criterion based on feedback from the group of user(s), associated with a preceding detection, and calculating a reliability index of a respective detection, the reliability index preferably depends on a weight of the detection criteria.

12. A non-transitory computer-readable medium comprising a computer program including software instructions which, when executed by a computer, implement the control method according to claim 11.

\* \* \* \* \*